United States Patent [19]

Asphaug et al.

[11] 3,936,588
[45] Feb. 3, 1976

[54] CONTROL SYSTEM FOR ELECTRICAL FURNACES

[75] Inventors: Bjorn Asphaug, Vagsbygd; Thor Pedersen, Hauketo, both of Norway

[73] Assignee: Elkem-Spigerverket, Oslo, Norway

[22] Filed: Dec. 4, 1974

[21] Appl. No.: 529,264

Related U.S. Application Data

[63] Continuation-in-part of Ser. No. 342,394, March 19, 1973.

[30] Foreign Application Priority Data

Mar. 20, 1972 Norway................................ 895/72

[52] U.S. Cl.......................................... 13/33; 13/12
[51] Int. Cl.². ........................................... F27D 3/10
[58] Field of Search ................... 13/1, 9, 13, 33, 12; 75/60; 214/17 C

[56] References Cited
UNITED STATES PATENTS

| | | | |
|---|---|---|---|
| 1,022,772 | 3/1912 | Clouston | 214/17 C |
| 3,431,344 | 3/1969 | Borreboch | 13/13 X |
| 3,518,350 | 6/1970 | Lunig | 13/12 |
| 3,534,143 | 10/1970 | Carlson et al | 75/60 X |
| 3,634,592 | 1/1972 | Pontke et al | 13/33 |

Primary Examiner—R. N. Envall, Jr.
Attorney, Agent, or Firm—Eyre, Mann & Lucas

[57] ABSTRACT

A computerized control system for receiving information concerning the operating parameters in an electrical furnace, and for controlling the feeding of corrective and additive charge to the furnace, for controlling the position of the electrodes, and for controlling the power consumed by the furnace. The system includes a discharge hopper for the selective discharge of solid materials to electric smelting furnaces. The hopper comprises a transit part and a reservoir part. Because of its physical construction, the transit part will empty before the reservoir part, but when the transit part is empty the contents of the reservoir part will follow automatically.

16 Claims, 6 Drawing Figures

CONTROL SYSTEM FOR ELECTRICAL FURNACES

Cross-Reference to Related Application

The present application is a continuation-in-part of copending U.S. patent application Ser. No. 342,394 entitled DISCHARGE HOPPER FOR ELECTRIC SMELTING FURNACES filed on Mar. 19, 1973 in the names of Bjorn Asphaug and Thor Pedersen. This parent application has been assigned to the assignee of the present application, Elkem-Spigerverket A/S.

BACKGROUND OF THE INVENTION

Electrical reduction furnaces have steadily grown in size over the years. During the past two decades, the maximum furnace size (expressed in MVA transformer capacity) has roughly doubled in size for 7 years. Furnace sizes will probably continue to increase due to several factors. First, the capital cost per ton of output is lower for the larger furnaces. Secondly, the number of operating personnel is not significantly larger for a large furnace than for a snall furnace, and since the cost of manpower continues to increase, the use of larger furnaces will enable this cost factor to be kept at a minimum. Thirdly, it is anticipated that there will be a continued increase in demand for ferroalloys, which demand must be met by greater production.

The anticipated increase in the size of electric smelting furnaces involves a number of considerations. First, the production capability of these larger units can be as high as about 1000 tons per day. This in turn means that small improvements in the operation of the larger furnaces may result in significant savings in production costs. Secondly, with the anticipated smaller numbers of larger furnaces, it is feasible to spend more money on instrumentation and control for each furnace. Thirdly, these larger furnaces behave sluggishly, and slowly-developing deviations in operating parameters are not easily detected by furnace operating personnel. Therefore, these larger furnaces have more need for automatic control than smaller furnaces.

SUMMARY OF THE INVENTION

The present invention is embodied in and carried out by a control system including a computer for receiving information concerning the various operating parameters of an electric smelting furnace, and for processing this information to control the feed of additive and corrective charge to the furnace, to control the position of the electrodes in the furnace, and to control the electrical power consumption of the furnace.

BRIEF DESCRIPTION OF THE DRAWINGS

The present invention may be better understood by reading the written description thereof with reference to the accompanying drawings, of which.

DETAILED DESCRIPTION OF THE PREFERRED EMBODIMENTS

Figure 4:
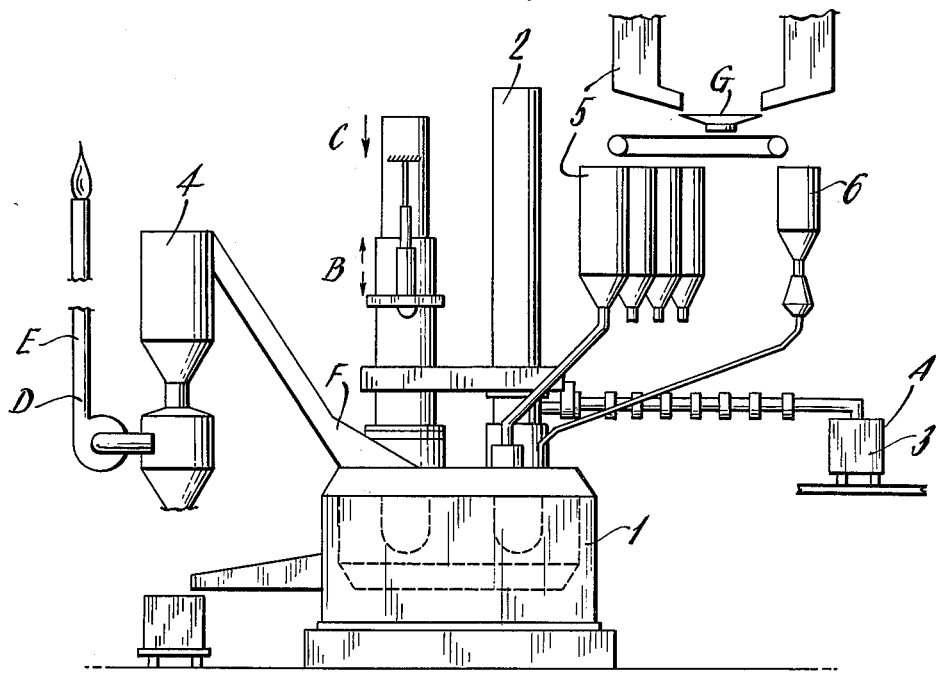
FIG. 4 illustrates a large furnace installation with accompanying instrumentation.

Referring specifically to FIG. 4, this illustrates an electric smelting furnace having a large capacity in the production of high-carbon ferromanganese. High-carbon ferromanganese maay be produced in either blast furnaces or electrical furnaces, but the trend is toward the use of the latter type of furnace. Depending on local conditions, one or more manganese ores are used to produce a metal of desired grade and specifications. Normally, coke is used as the reducing agent. The manganese content and the basicity of the slag vary within wide limits. Frequently, a 30–40 percent manganese slag is produced. This slag is utilized as a raw material for silicon manganese production. Fluxes may be used to produce the desired basicity in the slag.

Ores, reducing agents and fluxes are fed to the furnace pot 1 in FIG. 4. In the furnace, the main reaction is a reduction of metal oxide with carbon in the form of coke. The necessary heat if supplied in the form of electrical energy fed to the furnace 1 through electrodes 2 from transformers 3. In the ferromanganese production process, the carbon has a dual role. Besides acting as a reducing agent, it also strongly influences the electrical resistance of the charge and melt within the furnace, and thus effects the dissipation of electrical power. Coke is to a certain degree accumulated under the electrodes 2, forming a coke bed similar to that which has been found to be developed in the smelting of pig iron. This coke bed largely determines the resistance and dissipation of electrical power, and thereby effects process temperatures, metallurgical reaction patterns and product composition. As a result, the carbon balance of the charge is very critical in the ferromanganese production process. If too much coke is fed to the furnace, the excess will accumulate and result in reduced electrical resistance, which in turn requires a higher position for electrodes 2 in order to maintain a constant electrode current. With the higher electrode position, smaller quantities of metal oxides are reduced by the CO formed primarily in the reaction zone, resulting in a higher carbon content in the product and higher power consumption per ton of product. These conditions are aggravated when the high temperature zone is moving upwards in the furnace 1, as coke may react with moisture in the raw charge material to form carbon monoxide and oxygen and thereby further increase the consumption of coke and electrical power.

If too little coke is added to the charge, the accumulated coke will gradually be consumed. The electrodes 2 will have to be moved downwards in the furnace. Since the coke bed is being depleted, off-grade metal may be produced and slag boilings may occur. These conditions often are more severe in large furnaces than in small ones. The slow accumulation or depletion of carbon is more difficult to detect in a large furnace because metal and slag analyses may be very little effected until the conditions are quite severe. Also, more time is needed to bring a large furnace back into balance.

Figures 1, 2:
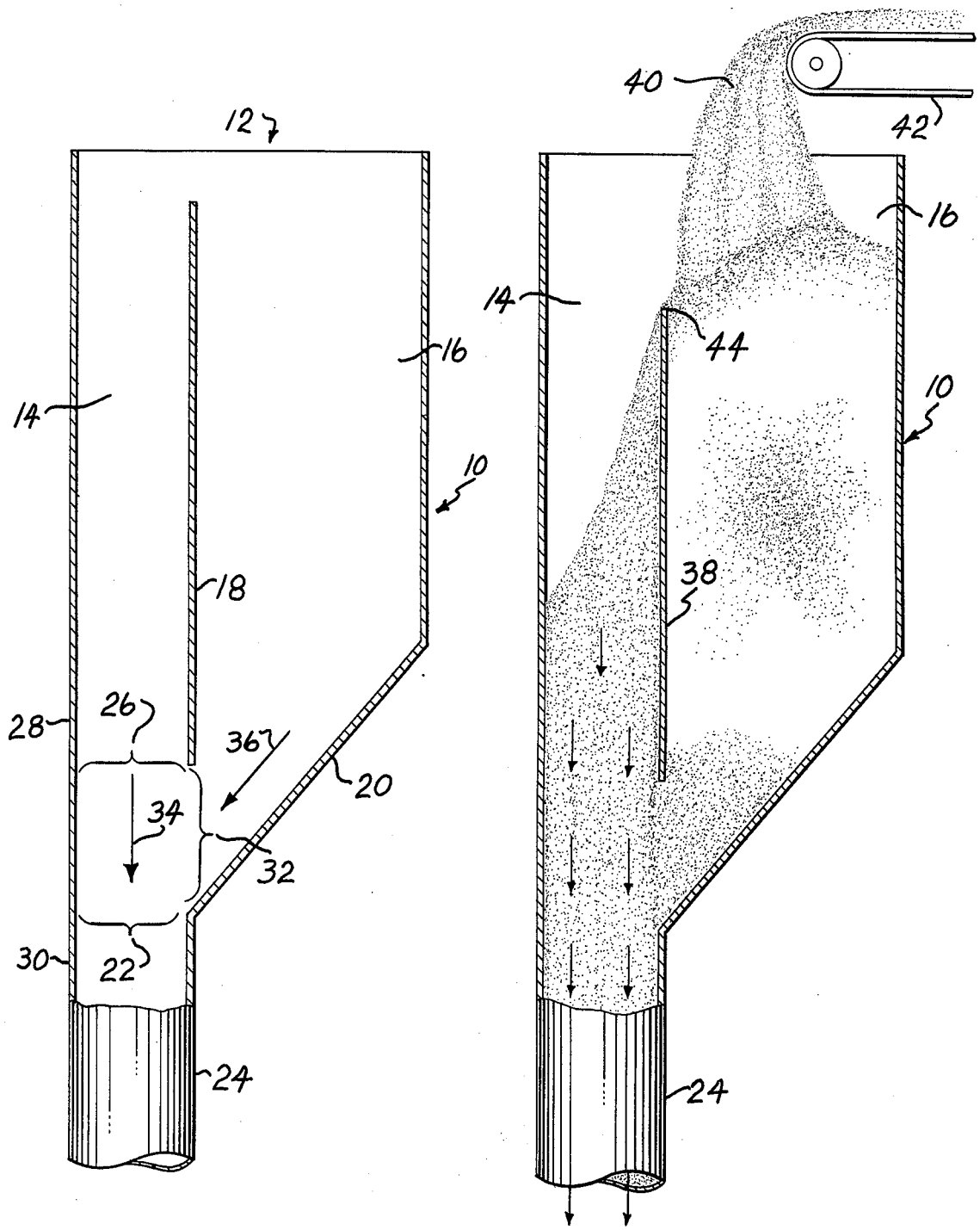
FIG. 1 illustrates a first hopper for utilization in the control system disclosed herein.
FIG. 2 illustrates a second hopper for utilization in the control system disclosed herein.
Figure 3:
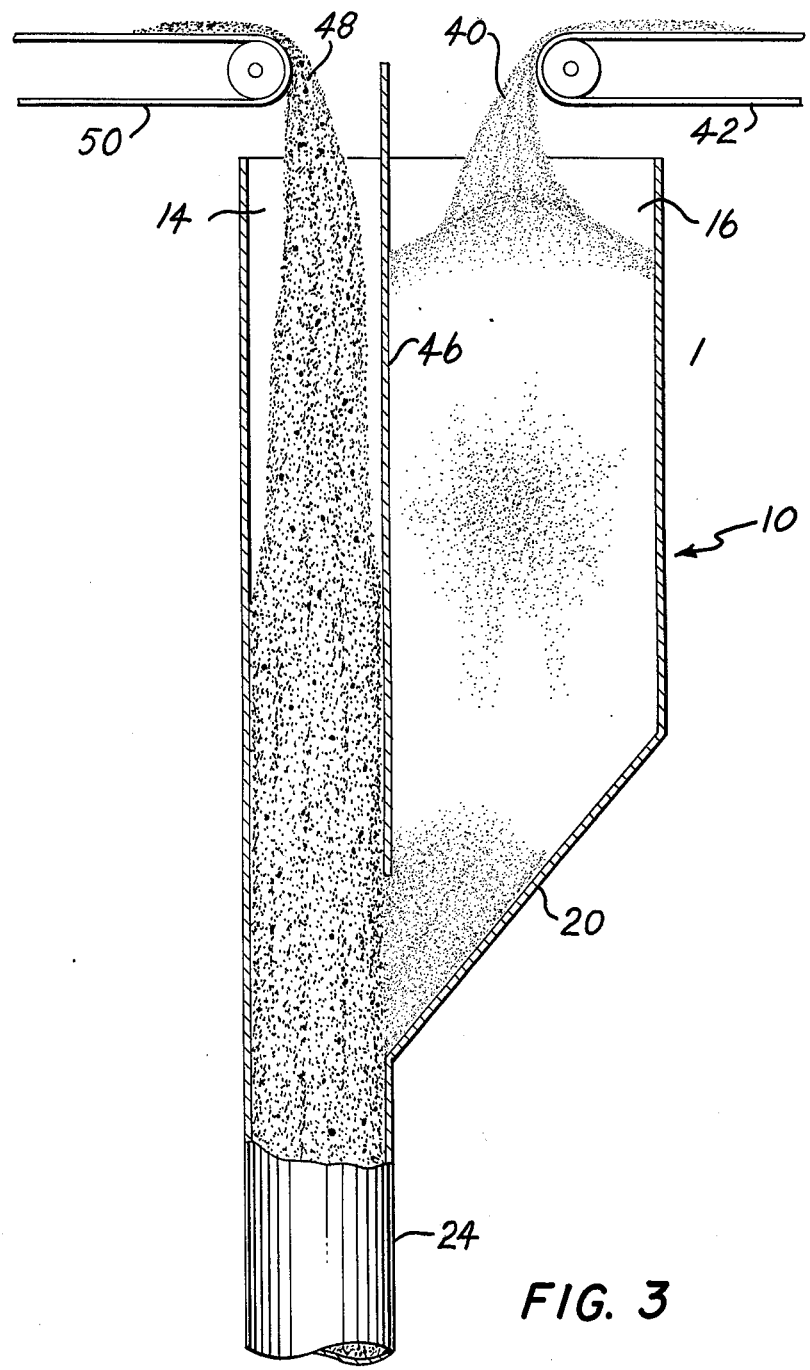
FIG. 3 illustrates a third hopper for utilization in the control system disclosed herein.
Figure 5:
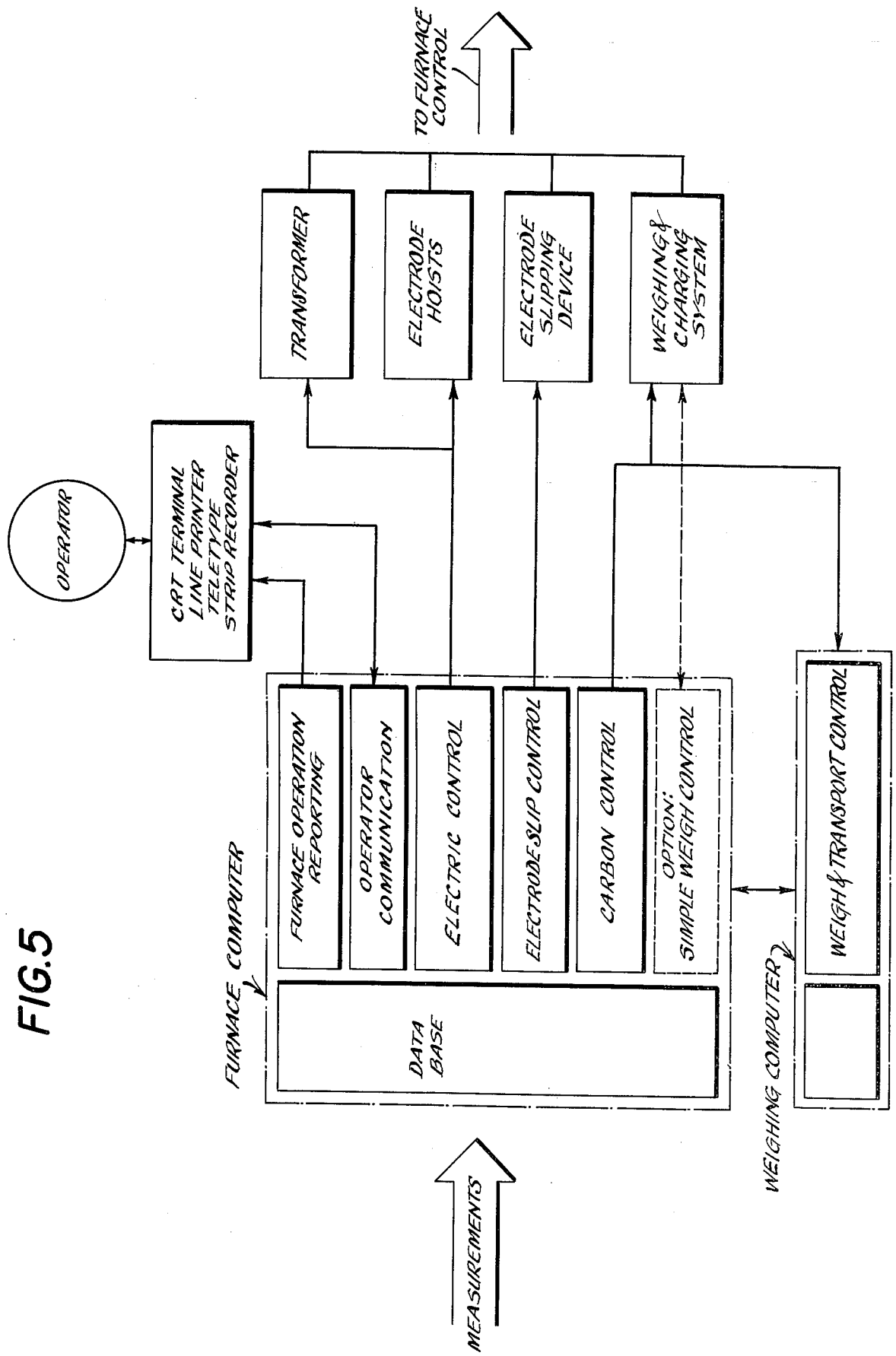
FIG. 5 is a block diagram illustrating the control system disclosed herein.

The control system embodying the present invention is designed to reduce the variations in the metallurgical process and to improve the average results. The furnace 1 is a three-phase circular closed furnace with a shell diameter of 11.8 meters and 1.7 meters electrode diameter. This furnace 1 is rated at 39 MVA, and is fed by a main charging system 5 which may include a plurality of furnace hoppers and a separate, gas-tight coke charging system 6, preferably with one feeding point for each electrode. However, the plurality of hoppers and the separate coke charging system 6 are preferably replaced by a partitioned hopper as shown in FIGS. 1, 2 and 3, which will be described further on. The gas system 4 provides an outlet for the gases generated during the metallurgical process, and quantitatively and qualitatively analyzes the various component gases such as $CO$, $CO_2$, $H_2$ and $O_2$. The furnace instrumentation provides readings on electrical parameters A, on electrode holder position B, on electrode slippage C, on gas flow rate D, on gas analysis E, on gas temperatures F, and on the weight of charge and additive materials G. These measurements are fed into the furnace computer, as shown in FIG. 5. The furnace computer has the capability of detecting process trends and slowly developing deteriorations, and can respond with furnace control output signals more rapidly and consistently than the best human operator. These are important capabilities in the control of a process which has considerable time lags in responding to control action. Merely by improving the consistency of the control action, the computer affords significant advantages over a human operator, even though the control strategy remains simple.

Like most metallurgical processes, the measurements which can be done in the electric smelting furnace are few, are often influenced by arbitrary disturbances, and their relation to the most significant process variables may not be easily deduced by a human operator. Although the furnace computer cannot produce information which is not in some way inherent in the measurements yielded by the furnace instrumentation, the computer is an efficient tool for extracting the most useful information from the signals fed in from the instrumentation. The furnace computer can treat these signals with statistical techniques and deduce trends and correlations not easily perceived by a human operator. The furnace can handle complicated equations and calculate estimates of process variables which themselves cannot be measured. The information handling capability of the furnace computer makes it useful as an aid to a human computer, even if the control actions are still done manually, i.e., its usefulness does not necessarily depend on closed loop operation. In open loop control applications, the furnace computer performs monitoring, logging and reporting functions. However, the furnace computer is preferaby used for closed loop control of the carbon content in the furnace charge, of the electrode current, and of the electrode position.

A preferred embodiment of the present control system employs a Norwegian-built Nord-1 computer with a 16K core memory and 16 bits wordlength. Peripheral equipment in this embodiment include a Teletype ASR 33, a paper tape reader, a card reader and a high-speed paper tape punch. The process interface includes an analog-digital converter with 64 analog inputs and 8 analog outputs, and 88 digital inputs and 64 digital outputs. The operator's console has the usual data displays, alarm lamps, switches for selection of display variables and data entry. A receive-only typewriter terminal is employed for the production of a furnace log in the form of a print-out. Print-out reports of measured and calculated variables are given at regular intervals. These variables are also available at the operator's console, and may be displayed with their appropriate dimensional units on a digital screen. Examples of calculated variables are the instantaneous metal production rate in tons per hour as calculated by gas analysis and gas flow rate measurements together with data for the ore mix and the metal grade; the instantaneous value of the specific power consumption in kilowatt hours per ton; raw material consumption; and electrode penetration estimates as calculated from gas analysis, gas temperature, assumed electrode consumption, etc. Certain variables are preferably checked against alarm limits. Alarm lights are provided to indicate air leakage through the furnace cover, water leakage, and uncontrolled electrode slipping.

In closed-loop control operation, the present system comprises a plurality of closed loops. Of these, the carbon balance control loop is considered the most important. The control strategy employed is based upon the dependency of charge resistance on the carbon concentration in the process. When excess carbon in the form of coke is accumulated in the furnace, resistance decreases, and the electrodes have to be raised to maintain constant electric conditions. In the same way, the electrodes will have to be lowered when too little coke is added to the charge and the coke bed is depleted. Therefore, when the electrodes are used to control the electric conditions, the electrode tip position will be related to the amount of coke in the furnace. This may be visualized as the electrodes resting on a coke bed of a certain height. Given these assumptions, a constant coke bed is equivalent to a constant electrode tip position. The high temperature reaction zone is moved up or down along with the electrodes, and the conditions for pre-reduction in the upper zone of the furnace are changed accordingly. This change is reflected in gas composition and gas temperature, which are the raw data used by the computer program to detect changes in tip position and to calculate the corresponding corrective action in terms of the quantity of coke to be added to the furnace charge. Separate tip position estimates for each of the three electrodes allow the use of the coke addition equipment for individual carbon control of each electrode, and thus enable the maintenance of electrical symmetry within the furnace.

A second loop closed by the computer controls the electrode currents. This is done by operating the conventional electrode regulators on constant impedance, and by having the computer adjust the impedance set points of the regulators to obtain symmetrical electrical loading at the optimum current value. The furnace computer control program considers the constraints of the electrical system, and on this basis controls the maximum permitted current, thereby controlling the maximum furnace load at any voltage tap.

The third loop closed by the computer controls the positions of the electrodes. With conventional control, electrode slippage of a fixed increment is triggered manually by the human operator, or automatically at regular time intervals by a clock. With the present system, the optimum time intervals are decided by the computer, and the furnace computer control program takes into account the electrode holder position, the estimated electrode length and the maximum slipping rate to maintain good baking conditions for the paste in the Soderberg electrodes.

Conventional furnace weighing and transporting systems do not normally meet the requirements of advanced furnace control. Applicants have found that a computer can be advantageously utilized for the purpose of improving the accuracy and controllability of the weighing process to meet the aforementioned requirements. A computer batch weighing and transport control system has been developed as a separate subsystem which may be installed and utilized separately on a permanent basis. It may also be considered a first step toward an extended system for a complete, integrated furnace computer control system, thus offering plant managers the possibility of entering the computer field with a relatively inexpensive step. Referring specifically to FIG. 5, although a simple weighing control may be incorporated into the furnace computer for controlling the weighing and charging system, it is preferable to have a separate weighing computer which receives information from the furnace computer concerning carbn control and directs the operation of the weighing and charging system accordingly. The weighing computer is adapted to the batch weighing equipment normally delivered with modern furnaces in order to achieve improved accuracy with automatic taring and overshoot compensation, individual charge corrections and feed mix control for different furnace hoppers or groups of hoppers feeding different furnace zones; optimal transport control; and complete raw material consumption reporting. The weighing computer controls the sequence in which the furnace hoppers are to be serviced. The normal sequence is determined by level indicators in the bypass channels of the divided furnace hoppers. Higher priority is given if material has been drawn from the main part of the hopper, so that its spare capacity has been reduced.

When a furnace hopper is to be serviced, the computer calculates the set points to be applied. The nominal set points of the desired feed mix recipe are corrected for zero weight offset of the empty scale hopper and for overshoots on the previous batch to the particular furnace hopper. The moisture content of the various raw materials may be given either as manual input or automatically from moisture measuring instruments, and the set points are corrected accordingly. Zone corrections are added to or subtracted from the set points if furnace hoppers feeding particular furnace zones are to be treated differently with regard to charge composition. Furnace zones may be specified as single furnace hoppers or groups of furnace hoppers, as desired. For the installation described, six furnace zones have been defined, each containing two feeding points. The finally corrected set points are compared to the actual scale weights by the computer as materials are fed into the scale hoppers. The computer controls the start and stop of the coarse and fine feeding, and reads he accurate weight each time the input feeders have been stopped and stable conditions have been obtained.

The weighing computer also controls the discharge feeders and checks the tare weight of the empty scale hoppers. A time delay between the discharge of each one of the four scale hoppers ensures a homogeneous mixing by a sandwiching effect.

The weighing computer controls the start and stop of the conveyors 42 and 50 in FIGS. 2 and 3, and monitors for correct positioning. The system permits several batches to be in transport at the same time, even when destined for different furnace hoppers. There is also a timing control which keeps track of the head and the tail of every batch in transport and helps to ensure a near-optimum utilization of the conveyor system capacity.

The advantages of the weighing computer are improved accuracy by proper overshoot compensation and reliable and extensive inventory reporting for raw materials. Of particular interest is the zone charging capability introduced. In particular, for charging systems with several furnace hoppers and a corresponding number of feeding points, this feature is very useful. One example is individual treatments of the three electrodes with regard to corrective actions on the feed mix. Another possibility would be to affect the electric conditions in a favorable way by systematic application of zone charging. For example, different amounts of coke, or different coke qualities, may be fed to the central and to the circumferential parts of the furnace. The simple and flexible system for changing set points or introducing zone corrections provides the practical means for sophisticated furnace control to the extent that an overall control system is introduced and control strategies exist.

The control system shown in FIG. 5 comprises a modular computer system designed in such a way that the various modules forming the system may be easily varied to accomodate a variety of furnace installations. This principle of modularity reduces the system development and programming costs for each installations, and eases the standardization that is essential for commercial acceptability.

The present invention includes a hopper which contains both a transit part and a reservoir part and in which the transit part will be completely emptied before the reservoir part begins to flow. However, because of the unique construction, material held in the reservoir part will be automatically fed to the discharge chute when the transit part is no longer feeding material.

In electric smelting furnaces such as for the production of pig iron, ferroalloys and carbides, there are usually a number of furnace hoppers which are arranged above the furnace as shown in FIG. 4 to supply the raw materials to the furnace. The hoppers will have discharge chutes which extend down into the furnace and end just above the top of the charge. The discharge tubes will open at the bottom end and as material comes from the hopper down through the discharge tube the raw material being fed will tend to rest on the charge beneath the mouth of each of the discharge chutes. Since the end of the discharge chute is not located very far above the bed of the charge, the discharged material will pile up and this will effectively limit the amount of material fed to the charge. The heap which rests on the charge will gradually sink into the charge and thus discharge from the hoppers takes place automatically and continuously.

While this is the ideal functioning of the hopper and discharge tube, unfortunatey material does not always run as smoothly as desired. There can be sudden sinkings of the charge in the furnace and if the amount of material held in the hopper is not sufficient to compensate for this, the flames from the furnace will be able to reach the charging equipment and will quickly cause damage, or burned toxic gases may escape into working areas. The charging equipment will also be damaged if the hopper runs out of material because of some breakdown in the system supplying raw material to the hopper.

Material fed from the hoppers to the charge include such material as reduction agents, fluxes, ores and the like. Because the hoppers must be made of a large capacity to prevent their running out, resulting in the consequent damage of equipment by flames from the furnace, there is usually a lag time of 4–8 hours between the addition of material to the top of the hopper and the time it is fed out through the discharge end. the charge mixture in the hoppers is proportioned so that a desired product can be obtained under the desired operating conditions. However, from time to time these proportions may need correction or adjustment in order to bring them into line with actual operating conditions. For example, it may be necessary to add more coke to raw ore to increase the conductivity of the charge or, conversely, it may be necessary to add fluxes to reduce the condictivity. Because of the lag time of 4–8 hours due to the necessarily large size of the hopper, it is not practical to add the additional corrective materials to the hopper since the effect of the correction will be delayed too long. In some cases corrective material can be added by hand. However, this has the disadvantage that the corrective material is not usually added in the exact position where it is most needed and there is the additional disadvantage that with covered furnaces such correction can be nearly impossible. In other cases, separate discharge chutes have been employed for the corrective material but this has the twofold disadvantage that it is difficult to position the corrective chute exactly to the position of the trouble spot and the corrective material will be added in concentrated from rather than distributed throughout the area where the hopper material is being discharged.

Applicants' form of construction for a hopper permits the addition of corrective materials in the area of the charge. In addition, this hopper can be effectively utilized to insure that the discharge tube does not run out of material thus permitting flames from the furnace to damage apparatus located above the hoppers. Applicants' form of apparatus comprises a hopper with two sections, one being a transit section and the other being a reservoir section. The transit section and reservoir section are located side by side with a dividing partition. The discharge end of the transit section is located directly above the receiving end of the discharge tube and is of approximately the same area. The reservoir section discharges into the receiving end of the discharge tube at an angle to the flow from the transit section to the discharge tube. Thus, becuase of well-known principals of physics, the flow from the transit section to the discharge tube will be preferred over the flow from the reservoir section to the discharge tube.

Referring now to FIG. 1, there is seen a hopper 10 having a receiving end 12. Transit chamber 14 and reservoir alignment chamber 16 are provided in the hopper and are separated by baffle 18. The reservoir 16 is provided with a sloped base 20 for urging material from the reservoir 16 into the mouth 22 of the discharge tube 24. The mouth 26 of the transit chamber is approximately equal in size to the mouth 22 of the receiving end of the discharge tube 24. The discharge end 28 of the transit chamber 14 is in aignment with the receiving end 30 of the discharge tube 24. As a result of this, there will be a straight flow of material from the transit chamber 14 to the discharge tube 24 whenever there is material in the transit chamber. The mouth 32 of the reservoir chamber is positioned so that in combination with the sloped base 20 material flowing from the reservoir chamber will be flowing at an angle to material flowing from the transit chamber to the discharge tube. In FIG. 1, the flow of material from the transit chamber to the discharge tube 24 is indicated by arrow 34 and the flow of material from the reservoir chamber is indicated by arrow 36. Because of the physical properties of the solid material, all of the solid materials from the transit chamber 14 will pass into the discharge tube 24 before any of the materials from the reservoir 16 pass into the discharge tube 24.

While the transit chamber 14 is shown in the drawing as a straight chamber, it will be understood that the transit chamber does not have to have this configuration so long as material fed from its discharge end is a straight flow into the receiving end of the discharge tube and so long as the feed from the discharge end of the reservoir is at an angle to the feed from the transit chamber to the discharge tube.

As mentioned hereinbefore, the size of the opening 26 of the transit chamber should be approximately the same size as the opening 22 of the discharge tube 24. The size of the opening 32 of the reservoir 16 is not critical so long as a free flow of material is provided from the reservoir 16 to the discharge tube 24 when there is no material in the transit section. The opening of the reservoir also must not be so large that it interferes with the flow of the material from the transit chamber to the discharge tube. In general, it has been found suitable for the opening 32 of the reservoir 16 to be approximately the same size or slightly larger than the opening 22 in the discharge tube 24.

Referring now to FIG. 2, there is shown the way in which applicants' hopper is used to continuously supply material to the discharge tube even though there may be interruption in the flow of material to the hopper and even though there may be a sudden requirement for additional material because of a rapid sinking of material from the discharge end (not shown) of the discharge tube caused by rapid sinking of discharged material. The hopper employed is approximately the same as the hopper of FIG. 1 except that the baffle 38 of FIG. 2 is somewhat shorter than the baffle 18 of FIG. 1. Raw material 40 is fed to the top of the hopper by means of a continuous conveyor belt 42. The raw material is fed into the reservoir chamber 16. As the feeding into the reservoir chamber continues, the material will back up from the discharge end of the discharge tube until it starts to collect in the reservoir and then it will completely fill the reservoir up to the top 44 of baffle 38. Thereafter, the material will overflow the reservoir section of the hopper and will flow directly through the transit section 14. As mentioned hereinbefore, the transit section will empty preferentially to the reservoir section and, therefore, the reservoir section will be maintained in a full condition so long as conditions are normal. If there is a sudden call for material in the discharge tube because of a change in the furnace, this can be readily taken care of by the excess material which is stored in the reservoir section of the hopper. Similarly, if for some reason there is a discontinuance of the feeding of raw material 40 to the hopper by continuous conveyor belt 42, the reservoir will continue to feed material to the discharge tube for a period of time thus permitting correction of the lack of flow of material to the hopper.

In FIG. 3 is shown a hopper according to the present invention for adding corrective materials. Again, the hopper is essentially the same as FIG. 1 except that in this case the baffle 46 is longer than the baffle 18 of FIG. 1 and in fact in FIG. 3 the baffle extends above the top of the hopper as shown. Raw material 40 is fed by continuous conveyor belt 42 to the reservoir 16 section of the hopper 10 and this material will flow down against sloped base 20 of the reservoir and into the discharge tube 24. In normal operation, the transit chamber 14 will be empty. since transit chamber 14 is normally empty, it can be used for the addition of corrective materials. In FIG. 3, corrective material 48 is being added to the transit chamber by belt conveyor 50.

As previously explained, the corrective material will be fed from the transit chamber 14 to the discharge tube 24 preferentially with respect to the feeding of the material in reservoir 16. Depending upon the particular circumstances, the material fed to transit chamber 14 could be strictly corrective material or it could be corrective material admixed with raw material 40 by mixing apparatus positioned before the belt conveyor 50 and not shown. Additionally, belt 50 could be made to operate intermittently for the periodic and preferential feeding of material to the charge through transit chamber 14. Various changes and modifications will be apparent to those skilled in the art. For example, chambers 14 and 16 could be completely separated vessels rather than joined in one hopper with a separating partition as shown. Furthermore, gates could be provided in the openings 32 and 26 if desired. While it has been stated that material from the transit chamber will flow to the discharge tube preferentially to the matter in the reservoir, it must be understood that under normal operating conditions there will usually be a trickle flow from the reservoir to the discharge tube even when the transit chamber is in use. This flow is not generally detrimental and, in fact is in some cases desirable since it will help to prevent sintering and bridge formation of material held in the reservoir.

Figure 6:
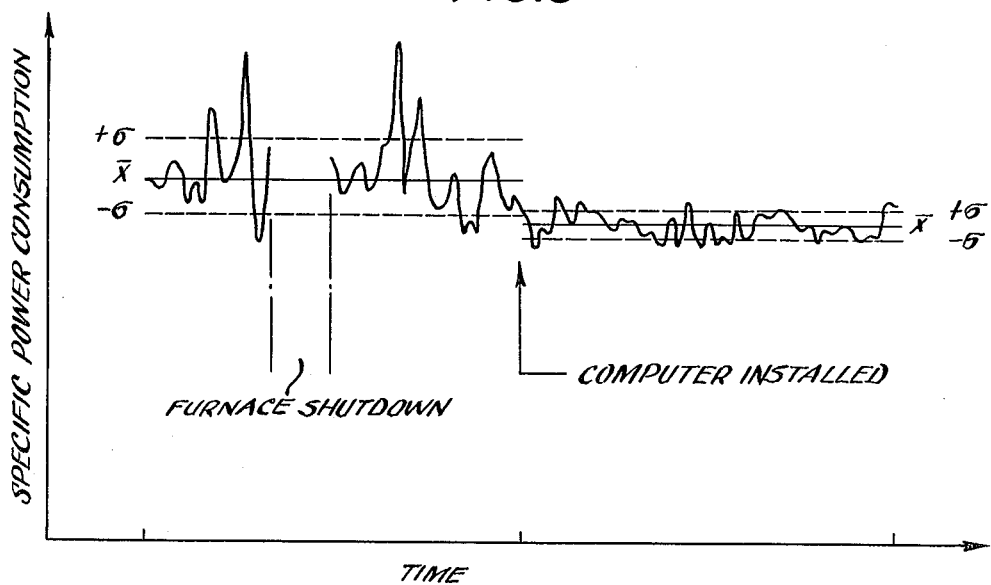
FIG. 6 is a plot of power consumption against time, showing the improvement yielded after the installation of the present control system.

Numerous advantages are yielded by the control system disclosed herein. The improved weighing accuracy yielded by computer control reduces the variations in the selected charge composition. Thus, one of the primary causes of process disturbances is minimized. In addition, a carbon control strategy using feedback signals from the process itself may be applied more consistently by a computer and the corrections to the coke addition can be effected earlier and more accurately than with human operator control. This will yield a more constant operation, closer to optimum conditions. Furthermore, with computer control of electrode position, the human error element has been removed, and a safer and more consistent electrode operation results. Also, computer control of the electrical conditions should allow utilization of the electrical system in a more efficient manner, with anticipated increase in furnace load and product output. This is illustrated in the graph of FIG. 6, which shows greatly reduced variation in specific power consumption after the installation of the computer system shown in FIG. 5. Specifically, there is less average power consumption $\overline{X}$ and less standard deviation $\pm \delta$. The closer control of the metallurgical processes yielded by the computer may reasonably be expected to lead to reduced maintenance work and less furnace downtime.

The present system has taken a number of physical embodiments in addition to that previously mentioned. For example, a PDP-8S (4K) computer has been employed to control a 2.7 MVA FeV arc furnace on the basis of spectrographic analyses. A Nord-1 (8K) computer has been employed to control an 18 MVA ferrosilicon (FeSi) furnace. A computer system comprising a Nord-1 with a 32K core memory and a 256K magnetic drum storage has been employed in a multi-furnace control system, and has the capacity for controlling several processes simultaneously. This system is in operation on a 51 MVA ferrosilicon furnace and is to be connected to a 33 MVA closed furnace for pig iron. A Philips P860 minicomputer with a ferrite core memory of 12K 16-bit words has been installed for control of the batch weighing and transport system for a 48 MVA ferromanganese furnace; a Philips M1OS (Modular Input/Output System) is used to interface the computer and the control system. This control system can be extended by the installation of a Philips P855 (16K) computer. A PDP-8S (4K) computer has been employed to control the electrical input and optimize the melting sequence in a 50 ton furnace for steel scrap melting. An IBM 1800 process computer system has been installed for pot-line control of an aluminum melting plant.

The advantages of the present invention, as well as certain changes and modifications of the disclosed embodiments thereof, will be readily apparent to those skilled in the art. It is the applicants' intention to cover all those changes and modifications which could be made to the embodiments of the invention herein chosen for the purposes of the disclosure without departing from the spirit and scope of the invention.

What is claimed is:

1. A control system for electrical furnaces comprising:
   1. computer means operative to receive a plurality of input signals indicative of metallurgical process parameters, and further operative to process said plurality of input signals and to generate a plurality of output signals for controlling the quantity and mixture of charge fed to the associated furnace, for controlling the position of the electrodes in the associated furnace, and for controlling the power consumed by the associated furnace; and
   2. charge feed means operative in response to at least one of said plurality of output signals to feed and control the quantity and mixture of charge to the associated furnace.

2. The control system according to claim 1 wherein said charge feed means comprises at least one hopper having at least one section.

3. The control system according to claim 1 wherein said charge feed means is linked to said at least one hopper by at least one conveyor means which is controlled by said computer means.

4. The control system according to claim 1 wherein said control system further comprises charge weighing means, and said computer means is operative to control the amounts of charge components fed to the associated furnace by said charge feed means in response to at least one of said plurality of output signals.

5. The control system according to claim 4 wherein said computer means comprises a furnace computer means and a weighing computer means.

6. The control system according to claim 5 wherein said weighing computer means is operative to correct the nominal set points of a desired feed mix receipe.

7. The control system according to claim 5 wherein said weighing computer means is operative to introduce a time delay between the discharge of each of a plurality of hoppers to ensure a homogeneous mixing of the charge components.

8. The control system according to claim 1 further comprising readout means operative to provide visual indications of selected input signals and of variables calculated by said computer means.

9. The control system according to claim 8 wherein said computer means is operative to perform in an open loop mode in which control actions are carried out manually by a human operator in response to said visual indications of said selected input signals to said computer means and of said variables calculated by said computer means.

10. The control system according to claim 1 further comprising input means operative upon manipulation by a human operator to transmit messages to said computer means.

11. A control system for electrical furnaces comprising:
   1. computer means operative to receive a plurality of input signals indicative of metallurgical process parameters, and further operative to process said plurality of input signals and to generate a plurality of output signals for controlling the charge fed to the associated furnace, for controlling the position of the electrodes in the associated furnace, and for controlling the power consumed by the associated furnace;
   2. charge feed means operative in response to at least one of said plurality of output signals to feed quantities of corrective and additive charge to the associated furnace;
   3. carbon balance control means operative to control carbon content in the charge in the associated furnace in a closed loop mode;
   4. current control means operative to control the currents through the electrodes of the associated furnace in a closed loop mode; and
   5. electrode control means operative to control the positions of the electrodes in the associated furnace in a closed loop mode.

12. The control system according to claim 11 wherein said carbon balance control means is operative in response to variations in charge resistance to adjust the concentration of carbon in the charge in the associated furnace.

13. The control system according to claim 11 wherein said current control means comprises electrode current regulators operated on constant impedance, the impedance set points of the regulators being adjusted by said computer means to obtain symmetrical electrical loading at the optimum current value.

14. The control system according to claim 11 wherein said electrode control means is operative to effect a predetermined amount of slippage of each electrode at optimum time intervals determined by said computer means.

15. The control system according to claim 2 wherein said at least one hopper comprises a reservoir section, a transit section, and a discharge tube, the transit section having a mouth at its discharge end which is of approximately the same size and area as the mouth of the receiving end of the discharge tube, the transit section being disposed with respect to the discharge tube to permit substantially straight flow of material from the discharge end of the transit section to the receiving end of the discharge tube, and the discharge end of the reservoir section being disposed to feed material to the discharge tube at an angle to the straight flow of material from the discharge end of the transit section to the receiving end of the discharge tube, whereby material fed to the transit section will pass to the discharge tube substantially in its entirety before any appreciable quantity of material passes from the reservoir section to the discharge tube.

16. The control system according to claim 15 wherein said reservoir section and said transit section are in the same hopper and are separated by a common partition.

* * * * *